(12) United States Patent
Diaz Brito

(10) Patent No.: US 11,572,834 B2
(45) Date of Patent: Feb. 7, 2023

(54) GAS TURBINE ENGINE COOLING SYSTEM

(71) Applicant: Rolls-Royce plc, London (GB)

(72) Inventor: Manuel Diaz Brito, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 17/152,139

(22) Filed: Jan. 19, 2021

(65) Prior Publication Data

US 2021/0246831 A1  Aug. 12, 2021

(30) Foreign Application Priority Data

Feb. 11, 2020 (GB) .................................. 2001821.4

(51) Int. Cl.
*F02C 7/18* (2006.01)
*F02K 3/04* (2006.01)

(52) U.S. Cl.
CPC .................. *F02C 7/18* (2013.01); *F02K 3/04* (2013.01); *F05D 2220/323* (2013.01); *F05D 2260/232* (2013.01)

(58) Field of Classification Search
CPC .... F02C 7/18; F02C 7/05; F02C 7/052; F02C 7/055; F02C 7/105–143;
(Continued)

(56) References Cited

U.S. PATENT DOCUMENTS 5,012,639 A    5/1991  Ream et al.
5,540,547 A *  7/1996  Cole ....................... F01D 11/24
                                                          24/339
(Continued)

FOREIGN PATENT DOCUMENTS

EP    111437 A1   6/1984
EP    2196634 A2  6/2010
(Continued)

OTHER PUBLICATIONS

A. Abou El-Azm Aly et al., Experimental study of the pressure drop after fractal-shaped orifices in turbulent pipe flows, 2010 Experimental Thermal and Fluid Science 34, pp. 104-111, Elsevier (Year: 2010).*

(Continued)

*Primary Examiner* — Stephanie Sebasco Cheng
(74) *Attorney, Agent, or Firm* — Oliff PLC

(57) ABSTRACT

Gas turbine engine including a nacelle and an engine core within the nacelle. The engine core defines a principal rotational axis along its length. The engine core and nacelle define a bypass passage therebetween. The gas turbine engine further includes a cooling system including a cooling duct, which duct defines an inlet for receiving bypass air from the bypass passage at an upstream location and an outlet for discharging the bypass air at a downstream location. The cooling duct extends, relative to the principal axis, axially and circumferentially around a section of the engine core. The cooling duct comprises: first portion that extends at least axially relative to the principal rotational axis; second portion downstream of the first portion that extends circumferentially around the engine core relative to the principal rotational axis; and third portion downstream of second portion that extends at least axially relative to the principal rotational axis.

17 Claims, 17 Drawing Sheets

(58) Field of Classification Search
CPC ......... F02C 7/16–185; F02K 3/02–077; F02K 3/115; F02K 3/08–12; B64D 2033/022; F02D 3/08–12; F05D 2260/2214–22141; F01D 11/14–18; F01D 11/24
See application file for complete search history.

(56) References Cited

U.S. PATENT DOCUMENTS

| | | | | |
|---|---|---|---|---|
| 7,717,667 | B2* | 5/2010 | Urbassik | F01D 11/24 415/1 |
| 7,861,513 | B2* | 1/2011 | Stretton | F02K 3/115 60/728 |
| 8,490,382 | B2 | 7/2013 | Zysman et al. | |
| 8,789,376 | B2 | 7/2014 | Coffinberry | |
| 8,915,701 | B2* | 12/2014 | Black | F02C 7/00 415/116 |
| 9,097,140 | B2 | 8/2015 | Hussain | |
| 9,797,311 | B2 | 10/2017 | Suciu et al. | |
| 9,803,546 | B2* | 10/2017 | Willie | F02C 6/04 |
| 11,078,842 | B2* | 8/2021 | Thomas | F28F 9/0246 |
| 2005/0150970 | A1 | 7/2005 | Beutin et al. | |
| 2007/0245739 | A1* | 10/2007 | Stretton | F02C 6/08 60/728 |
| 2009/0173834 | A1* | 7/2009 | Prince | B64C 23/06 244/198 |
| 2009/0175718 | A1* | 7/2009 | Diaz | F01D 25/12 415/180 |
| 2009/0188234 | A1* | 7/2009 | Suciu | F02K 3/115 60/39.83 |
| 2009/0297342 | A1* | 12/2009 | Laborie | F02K 3/06 415/177 |
| 2016/0017804 | A1* | 1/2016 | Afrianto | F02C 6/08 60/39.092 |
| 2017/0254268 | A1* | 9/2017 | Lord | F02C 7/185 |
| 2017/0260905 | A1* | 9/2017 | Schmitz | F28F 13/06 |
| 2018/0347377 | A1* | 12/2018 | Fölbach | F01D 9/00 |
| 2019/0145315 | A1* | 5/2019 | Dow | F01D 11/24 251/305 |

FOREIGN PATENT DOCUMENTS

| | | | | |
|---|---|---|---|---|
| GB | 2229496 | A | | 9/1990 |
| GB | 2437377 | A * | 10/2007 | ............. F02C 7/141 |
| GB | 2445237 | A | | 2/2008 |

OTHER PUBLICATIONS

Jul. 5, 2021 extended Search Report issued in European Patent Application No. 21150825.4.
Abou El-Azm Aly, A., et al., "Experimental study of the pressure drop after fractal-shaped orifices in turbulent pipe flows," Experimental Thermal and Fluid Science, vol. 34, pp. 104-111, 2010.

* cited by examiner

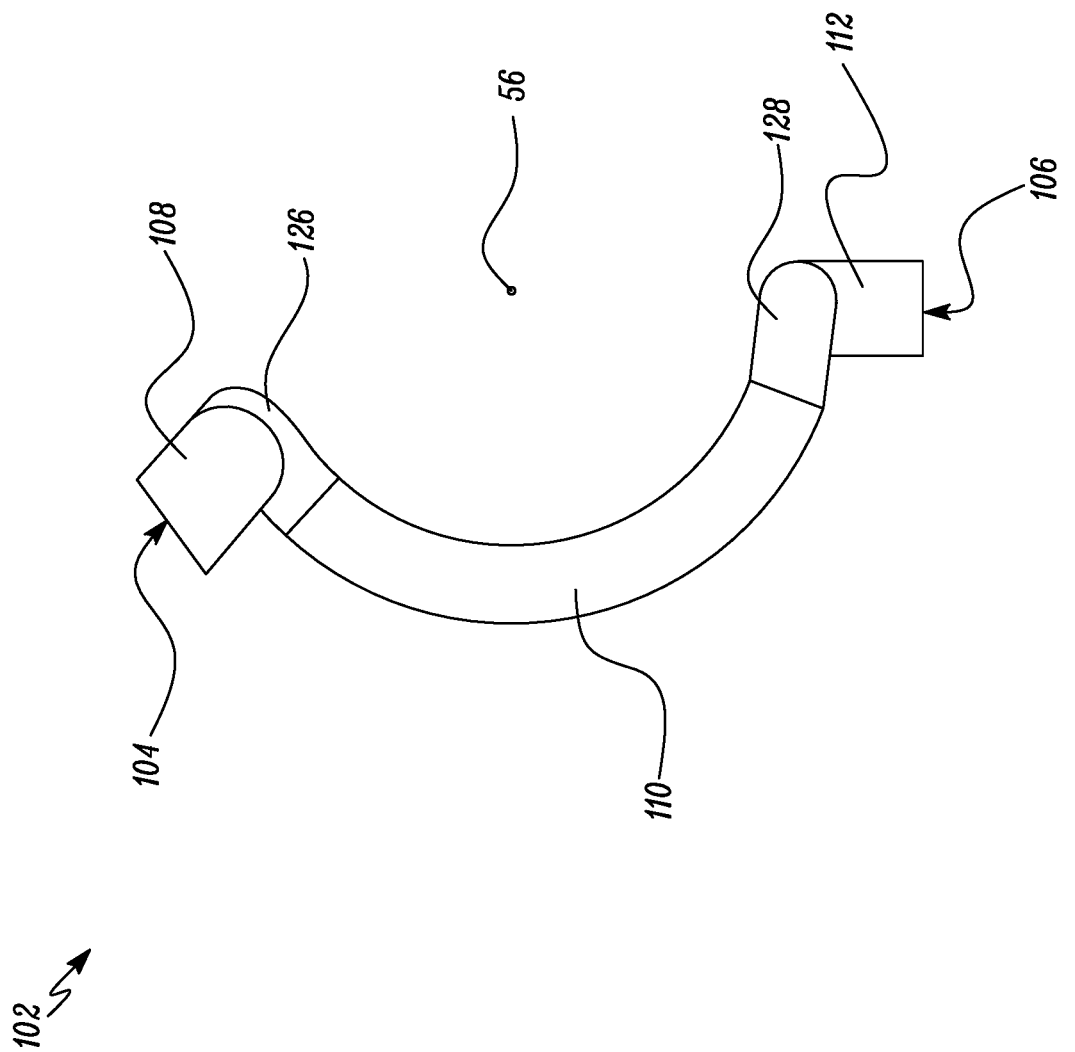

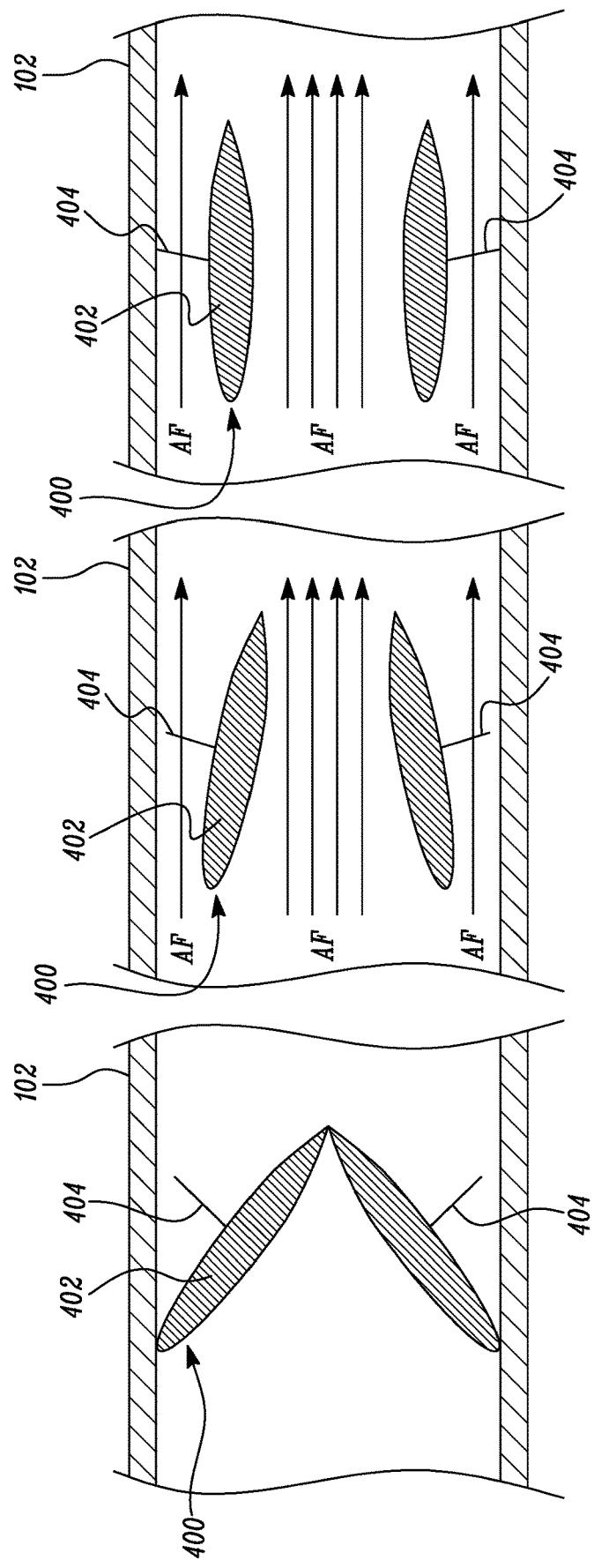

GAS TURBINE ENGINE COOLING SYSTEM

CROSS-REFERENCE TO RELATED APPLICATIONS

This application claims priority pursuant to 35 U.S.C. 119(a) of United Kingdom patent application number GB 2001821.4 filed on Feb. 11, 2020, the entire contents of which are incorporated herein by reference.

BACKGROUND

Field of the Disclosure

The present disclosure relates to gas turbine engines and, more particularly, to cooling systems for gas turbine engines.

Description of the Related Art

Gas turbine engines are used for power generation and vehicle (e.g., aircraft) propulsion. A typical gas turbine engine includes a compressor section, a combustor section, and a turbine section that utilize a primary air flow into the engine to generate power or propel the vehicle.

Air may be bled from the compressor section of the engine for cooling and sealing purposes. The cooling air may be needed to protect materials of the engine from early degradation and to prevent the materials from reaching temperatures which would be detrimental to their properties. However, in some cases, the cooling air may not provide sufficient cooling. Further, there is a limit to an amount of air that can be bled from the compressor section without impacting normal operation of the engine.

SUMMARY

According to a first aspect there is provided a gas turbine engine including a nacelle and an engine core received within the nacelle. The engine core defines a principal rotational axis along its length. The engine core and the nacelle define a bypass passage therebetween. The gas turbine engine further includes a cooling system including a cooling duct. The cooling duct defines an inlet for receiving bypass air from the bypass passage at an upstream location and an outlet for discharging the bypass air at a downstream location. The cooling duct extends, relative to the principal axis, both axially and circumferentially around a section of the engine core. The cooling duct comprises: a first portion that extends at least axially relative to the principal rotational axis; a second portion downstream of the first portion that extends circumferentially around the engine core relative to the principal rotational axis; and a third portion downstream of the second portion that extends at least axially relative to the principal rotational axis.

Since the cooling system uses the bypass air flowing through the bypass passage and discharges the bypass air back into the bypass passage, the cooling system may provide cooling to the engine core without impacting normal operation of the gas turbine engine. Since the cooling duct extends both axially and circumferentially around the section of the engine core, heat transfer between the engine core and the cooling duct may be enhanced.

The engine core may include a combustor section. The cooling duct extends, relative to the principal axis, circumferentially around a section of the engine core including the combustor section.

The gas turbine engine may further include one or more grids disposed within the cooling duct for preventing debris entering the cooling duct. The one or more grids may include a first grid disposed proximate to the inlet and a second grid disposed proximate to the outlet. At least one of the one or more grids may be a fractal grid. The one or more grids may be used to further enhance the heat exchange rate.

The gas turbine engine may further include a non-return valve disposed within the cooling duct for preventing airflow from the outlet to the inlet. The non-return valve may be disposed proximate to the outlet. The non-return valve may be a tricuspid valve. The tricuspid valve may operate without any actuator.

The cooling system may further include one or more heat transfer enhancement elements disposed between the engine core and the cooling duct for increasing heat transfer from the engine core to the cooling duct. The one or more heat transfer enhancement elements may include at least one of fins and heat pipes.

The cooling system may further include one or more airflow boosters disposed within the cooling duct. The one or more airflow boosters may include at least one of nozzle ejectors, an electric fan and micro-compressors.

The cooling duct may be spiral-shaped.

The cooling system may include a plurality of the cooling ducts.

The cooling system may include two cooling ducts that merge with each other at a junction downstream of their inlets so that the two cooling ducts share a common outlet.

Each of the two cooling ducts may include a first portion extending at least axially relative to the principal rotational axis and a second portion downstream of the first portion. The second portion may extend circumferentially around the engine core relative to the principal rotational axis. The two cooling ducts may merge with each other at the junction downstream of the second portions.

The two cooling ducts may include a shared third portion downstream of the junction and extending at least axially relative to the principal rotational axis. The third portion may include the common outlet.

The gas turbine engine may further include a non-return valve disposed downstream of the junction and upstream of the common outlet for preventing airflow from the common outlet to the inlets of the two cooling ducts.

The gas turbine engine may further include a grid disposed downstream of the junction and upstream of the common outlet for preventing debris entering the common outlet of the two cooling ducts.

The cooling system of the present disclosure may provide cooling to the engine core without requiring any additional power or actuators, thereby enhancing cooling without impacting the efficiency of the gas turbine engine. Further, the cooling system may need minimal maintenance or servicing.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

Each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

Each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e., the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e., the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e., the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1} K^{-1}/(ms^{-1})^2$). The fan tip loading may be in an inclusive range bounded by any two of the values in the previous sentence (i.e., the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass passage to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass passage may be substantially annular. The bypass passage may be radially outside the engine core. The radially outer surface of the bypass passage may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e., the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e., the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e., the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e., the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass passage to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e., maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIGS. 5A-5C are perspective, top and front views of a cooling duct of the cooling system of FIG. 4;

FIGS. 10A-10C are schematic top views of the non-return valve of FIGS. 9A-B in closed, partially open and open positions;

DETAILED DESCRIPTION

Aspects and embodiments of the present disclosure will now be discussed with reference to the accompanying figures. Further aspects and embodiments will be apparent to those skilled in the art.

As used herein, a component extends "axially" relative to an axis if the component extends along the axis. A component extends "circumferentially" relative to an axis if the component extends in a circumferential direction defined around the axis. A component extends "radially" relative to an axis if the component extends radially inward or outward relative to the axis.

Figure 1:
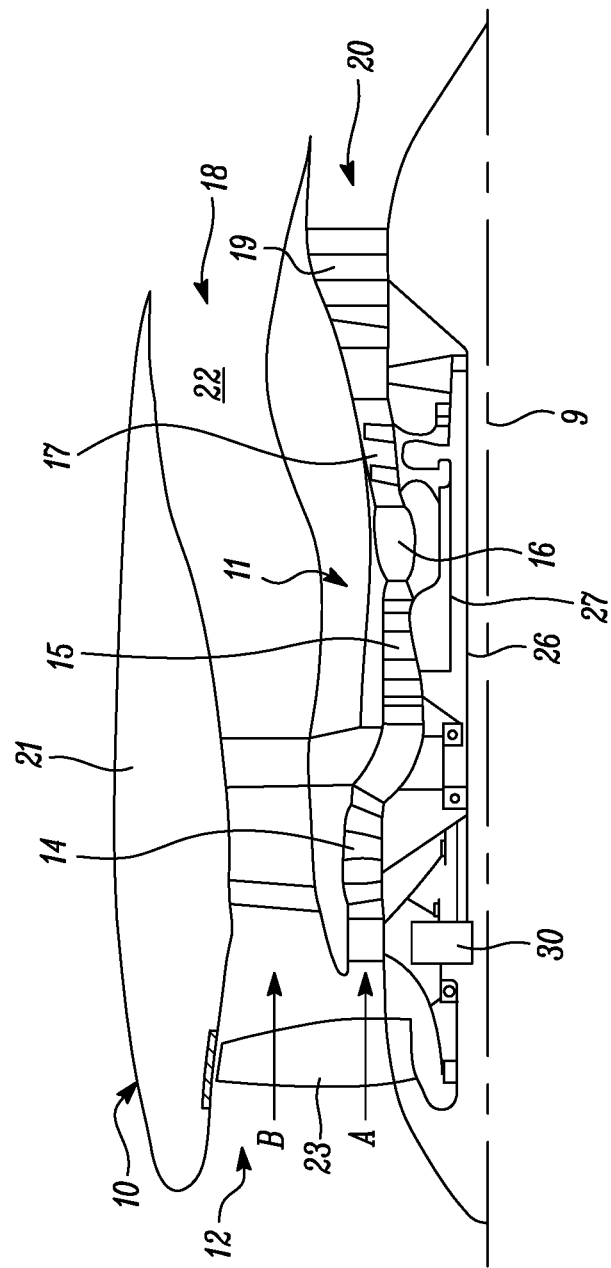
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, a combustor section 16, a high pressure turbine 17, a low pressure turbine 19 and a core exhaust nozzle 20. A nacelle 21 surrounds the gas turbine engine 10 and defines a bypass passage 22 and a bypass exhaust nozzle 18. The bypass airflow B flows through the bypass passage 22. The propulsive fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustor section 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The propulsive fan 23 generally provides the majority of the propulsive thrust. The epicyclic gearbox 30 is a reduction gearbox.

Figure 2:
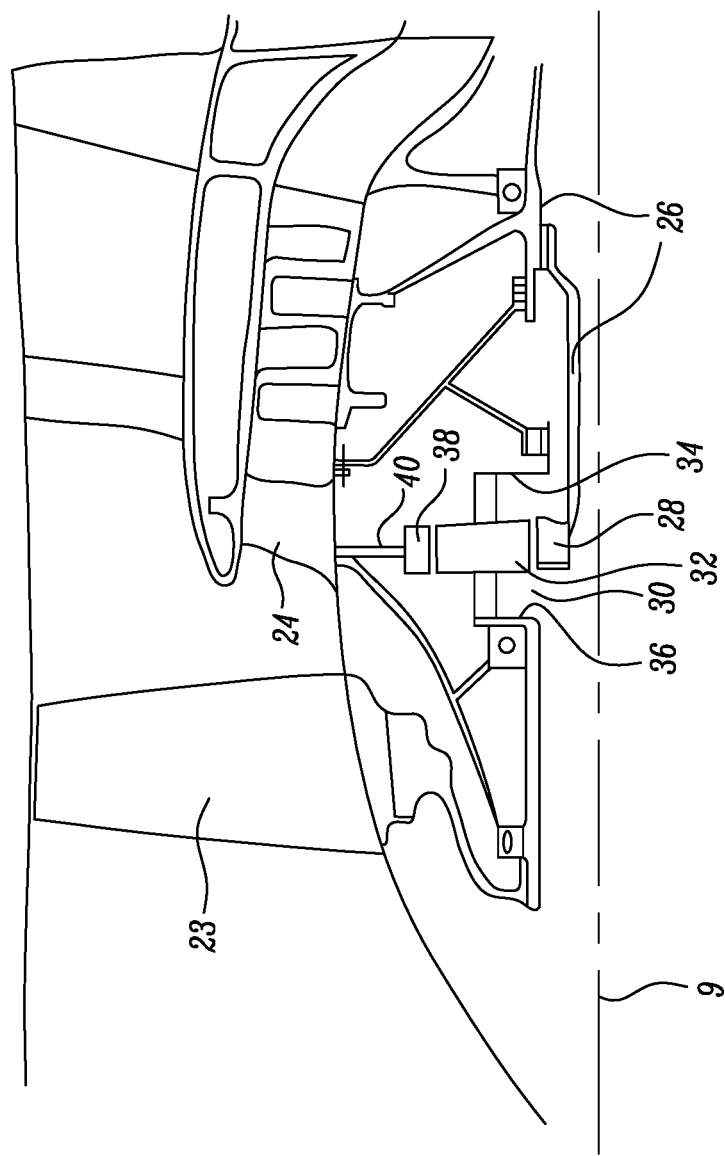
FIG. 2 is a close-up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the propulsive fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e., not including the propulsive fan 23) respectively and/or the turbine and compressor stages that are connected together by the interconnecting shaft 26 with the lowest rotational speed in the engine (i.e., not including the gearbox output shaft that drives the propulsive fan 23).

In some literature, the "low pressure turbine" and "low pressure compressor" referred to herein may alternatively be known as the "intermediate pressure turbine" and "intermediate pressure compressor". Where such alternative nomenclature is used, the propulsive fan 23 may be referred to as a first, or lowest pressure, compression stage.

Figure 3:
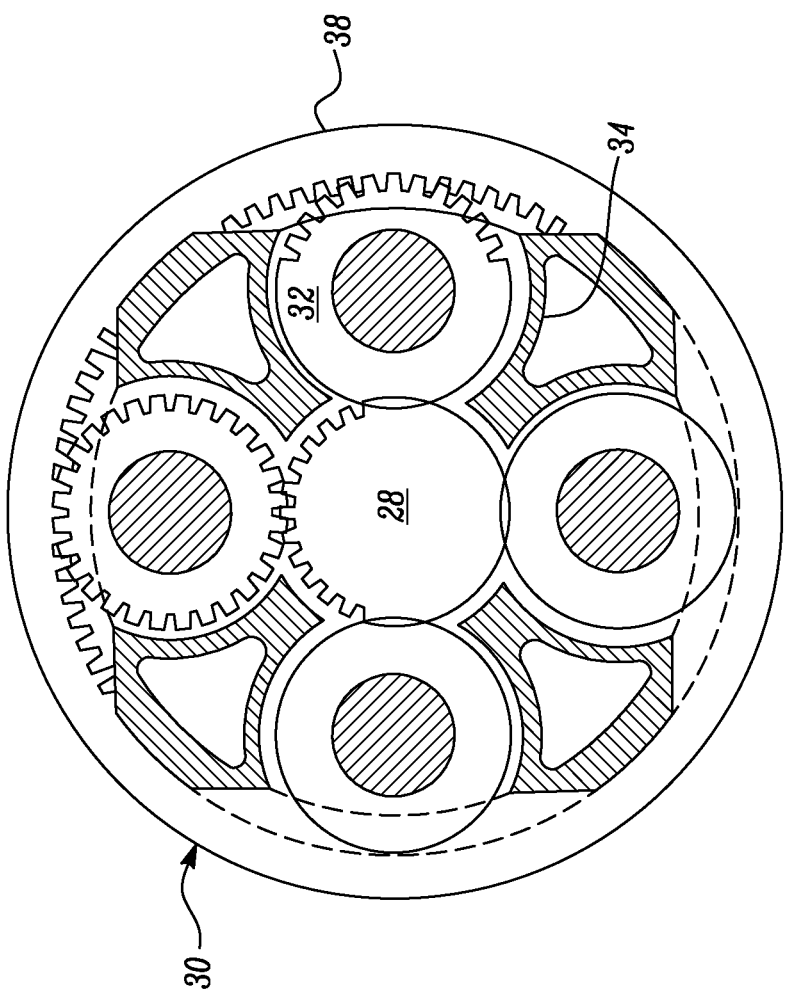
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the propulsive fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass passage 22 has its own nozzle 18 that is separate to and radially outside the core exhaust nozzle 20. However, this is not limiting, and any aspect of the present disclosure may also apply to engines in which the flow through the bypass passage 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the principal rotational axis 9), a radial direction (in the bottom-to-top direction in FIG. 1), and a circumferential direction (perpendicular to the page in the FIG. 1 view). The axial, radial and circumferential directions are mutually perpendicular.

In addition, the present disclosure is equally applicable to aero gas turbine engines, marine gas turbine engines and land-based gas turbine engines.

Figure 4:
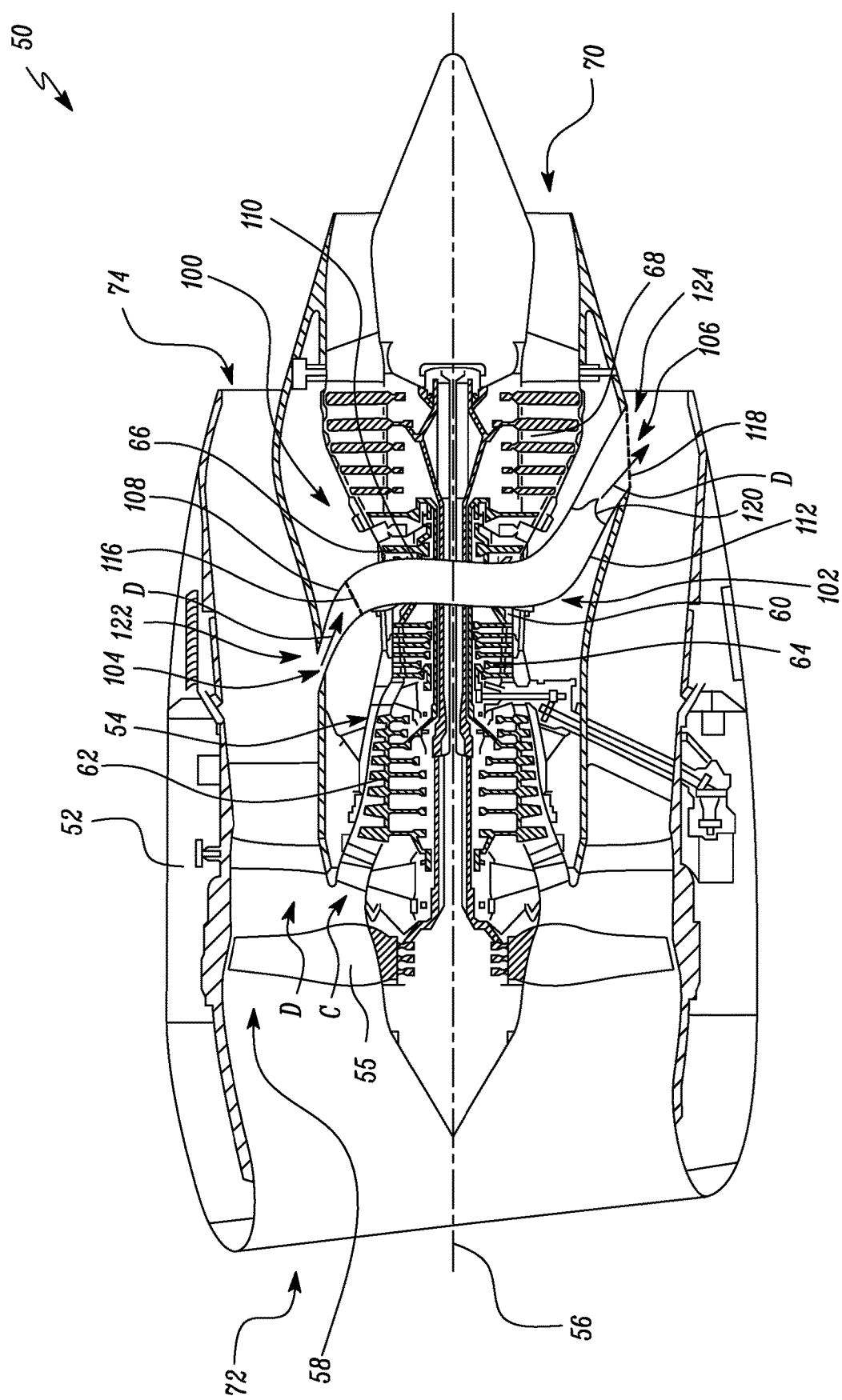
FIG. 4 is a sectional side view of a gas turbine engine including a cooling system having a cooling duct.

FIG. 4 is a sectional side view of a gas turbine engine 50. The gas turbine engine 50 may be used for propulsion of an aircraft. The gas turbine engine 50 may be similar to the gas turbine engine 10 of FIG. 1. The gas turbine engine 50 includes a nacelle 52, an engine core 54, and a propulsive fan 55. The engine core 54 is received within the nacelle 52. The engine core 54 defines a principal rotational axis 56 along its length. In other words, the engine core 54 and the nacelle 52 are circumferentially disposed about the principal rotational axis 56. The engine core 54 further includes, in axial flow series, a low pressure compressor 62, a high pressure compressor 64, a combustor section 60, a high pressure turbine 66, a low pressure turbine 68, a core exhaust nozzle 70.

The engine core 54 and the nacelle 52 define a bypass passage 58 therebetween. The gas turbine engine 50 further includes an air intake 72 and a bypass exhaust nozzle 74. The propulsive fan 55 that generates two airflows: a core airflow C and a bypass airflow D. The engine core 54 receives the core airflow C. The bypass airflow D flows through the bypass passage 58. The bypass airflow D is interchangeably referred to as "the bypass air D".

The gas turbine engine 50 further includes a cooling system 100. The cooling system 100 includes a cooling duct 102. In the example of FIG. 4 the cooling system 100 includes a single cooling duct 102. However, in some other examples, the cooling system 100 may include a plurality of the cooling ducts 102 similar to the cooling duct 102.

The cooling duct 102 extends, relative to the principal rotational axis 56, both axially and circumferentially around a section of the engine core 54. In an example, the cooling duct 102 extends, relative to the principal rotational axis 56, circumferentially around a section of the engine core 54 including the combustor section 60. The section of the engine core 54 may be a high pressure section.

The cooling duct 102 is a hollow tubular component having an inlet 104 and an outlet 106. The cooling duct 102 defines the inlet 104 for receiving the bypass air D from the bypass passage 58 at an upstream location 122 and the outlet 106 for discharging the bypass air D at a downstream location 124. The inlet 104 and the outlet 106 may be flush with the outer skin of the core. The cooling duct 102 guides a portion of the bypass air D from the upstream location 122 to the downstream location 124, the downstream location 124 being upstream of the bypass discharge nozzle. The cooling duct 102 further includes a first portion 108, a second portion 110 and a third portion 112. The first portion 108 extends at least axially relative to the principal rotational axis 56. The second portion 110 is downstream of the first portion 108. The second portion 110 extends circumferentially around the engine core 54 relative to the principal rotational axis 56. The third portion 112 is downstream of the second portion 110 and extends at least axially relative to the principal rotational axis 56.

The cooling duct 102 surrounds the engine core 54. The cooling duct 102 may direct the bypass air D around the engine core 54 by means of venturi effect from the upstream location 122 to the downstream location 124 of the bypass passage 58. In an example, the cooling duct 102 may extend along an outer surface (not shown in FIG. 4) of the engine core 54. In some examples, the cooling duct 102 contacts the outer surface of the section of the engine core 54 including the combustor section 60. In some examples, the cooling duct 102 may contact and extend along the outer surface of a high-pressure section of the engine core 54 adjacent to the combustor section 60. The high-pressure section may include the high-pressure compressor 64 and the high pressure turbine 66.

The bypass air D is guided around the engine core 54 by the cooling duct 102. In order to minimise pressure losses, the Mach number may be kept approximately constant downstream of the first portion 108 of the cooling duct 102, up to a point proximate to the outlet 106. A cross-sectional area of the cooling duct 102 may be reduced proximate to the outlet 106 to increase the Mach number and provide a needed thrust. The increase in Mach number may generate suction to draw the bypass air D into the inlet 104. In some examples, a difference in the Mach number between two points in the cooling duct 102 can be used to produce a cross-flow around the engine core 54, thereby channelling the bypass air D across from the inlet 104 to the outlet 106.

In this example the cooling duct 102 is spiral shaped. The cooling duct 102 spirals half a turn (i.e., about 180 degrees) around the engine core 54 relative to the principal rotational axis 56. In other examples the cooling duct 102 may spiral less than half a turn (i.e., less than 180 degrees) around the engine core 54 or more than half a turn (i.e., greater than 180 degrees) around the engine core 54. In some examples, the cooling duct 102 may spiral a whole turn or multiple turns (i.e., greater than or equal to 360 degrees) around the engine core 54. Increase the number of turns (or the angular extent of the turn if there is less than one turn or a fractional number of turns) of the cooling duct 102 may enable higher heat exchange. Further, a smaller cross-section of the cooling duct 102 may increase a rate of flow of the bypass air D, which may in turn further increase the heat exchange. The number of turns in the cooling duct 102 and the cross-section of the cooling duct 102 may vary according to the desired cooling attributes as well as the space requirements of the application.

The cooling system 100 of the gas turbine engine 50 may further include one or more grids 116, 118 disposed within the cooling duct 102 for preventing debris entering the cooling duct 102. Each of the one or more grids may have a rectangular grid pattern. In other examples, each of the one or more grids may have a square, triangular, polygonal, circular or irregular grid pattern. In some examples, the at least one of the one or more grids may be a fractal grid, as described in more detail below with reference to FIG. 8. In the example illustrated in FIG. 4, two grids are disposed within the cooling duct 102 for preventing debris entering the cooling duct 102. Specifically, a first grid 116 and a second grid 118 are disposed within the cooling duct 102.

The first grid 116 is disposed proximate to the inlet 104. The second grid 118 is disposed proximate to the outlet 106.

The cooling system 100 may further include one or more non-return valves disposed within the cooling duct 102 for preventing airflow from the outlet 106 to the inlet 104. In the example illustrated in FIG. 4, the cooling system 100 of the gas turbine engine 50 includes a non-return valve 120 disposed within the cooling duct 102. The non-return valve 120 is disposed proximate to the outlet 106. The non-return valve 120 may be a tricuspid valve. The non-return valve 120 may prevent backflow in the cooling duct 102.

In some examples the cooling system 100 further includes one or more heat transfer enhancement elements (not shown in FIG. 4) disposed between the engine core 54 and the cooling duct 102 for increasing heat transfer from the engine core 54 to the cooling duct 102. The one or more heat transfer enhancement elements may include at least one of fins and heat pipes, as explained in more detail below with reference to FIG. 11.

In some examples, the cooling system 100 further includes one or more airflow boosters (not shown in FIG. 4) disposed within the cooling duct 102. The one or more airflow boosters include at least one of nozzle ejectors, an electric fan and micro-compressors. Air flow boosters are described in more detail below with reference to FIG. 12.

The cooling system 100 may be a passive and an actuator-free system. In other words, the cooling system 100 may not need any additional components to power the cooling system 100. The cooling system 100 may reduce the temperature of a high-pressure cooling air that flows around the combustor section 60 of the gas turbine engine 50. The cooling air may flow within the engine core 54. The air, in turn, may reduce the temperature of downstream components such as the high and intermediate pressure turbines; high and intermediate pressure vanes; high, intermediate and/or low-pressure rotating discs; inter-turbine bearing chambers; and other turbine sealing flows. The cooling system 100 may improve a cooling effectiveness of the gas turbine engine 50 and in turn increase life of its components.

Figure 5A:
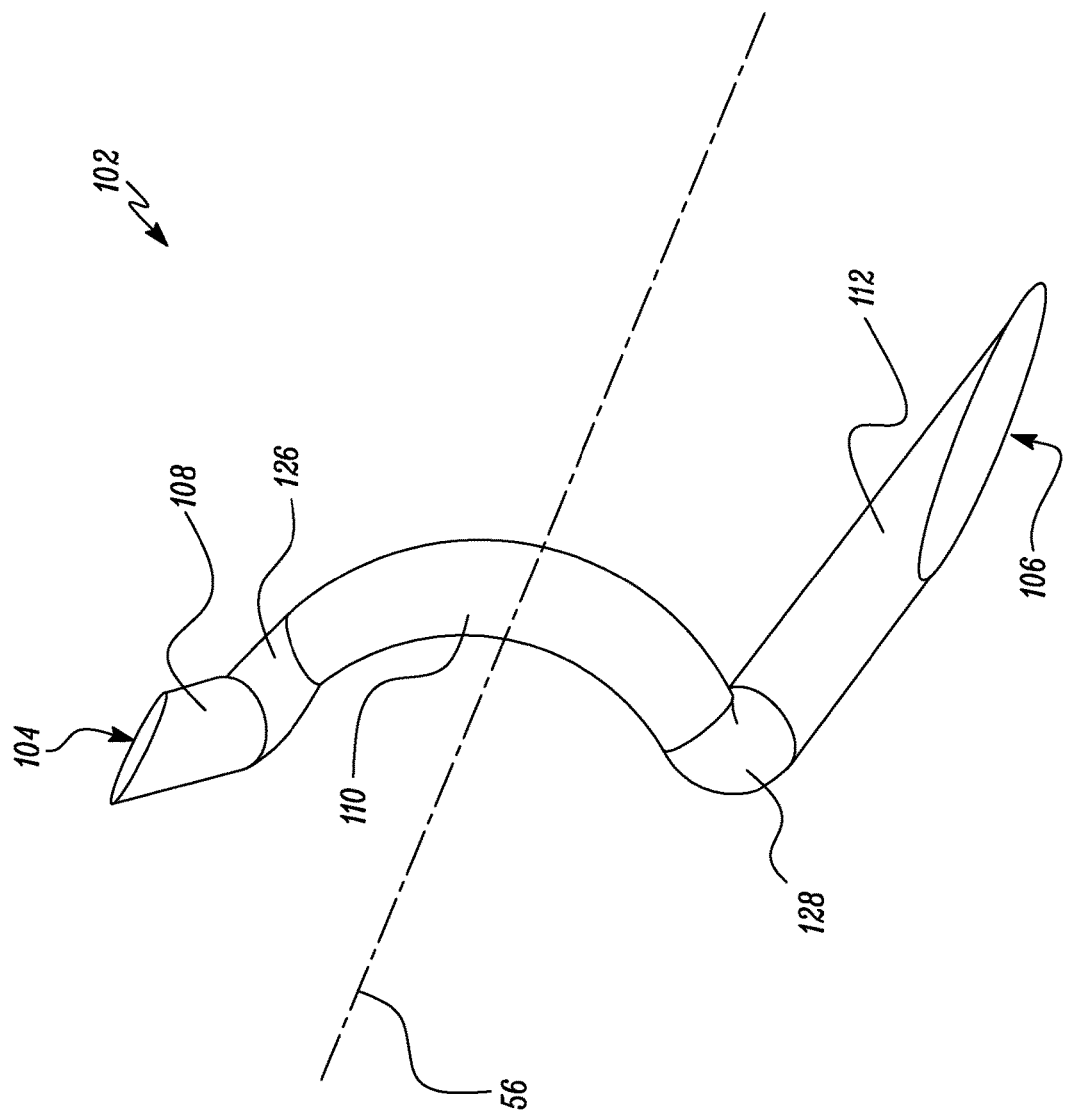
Figure 5B:
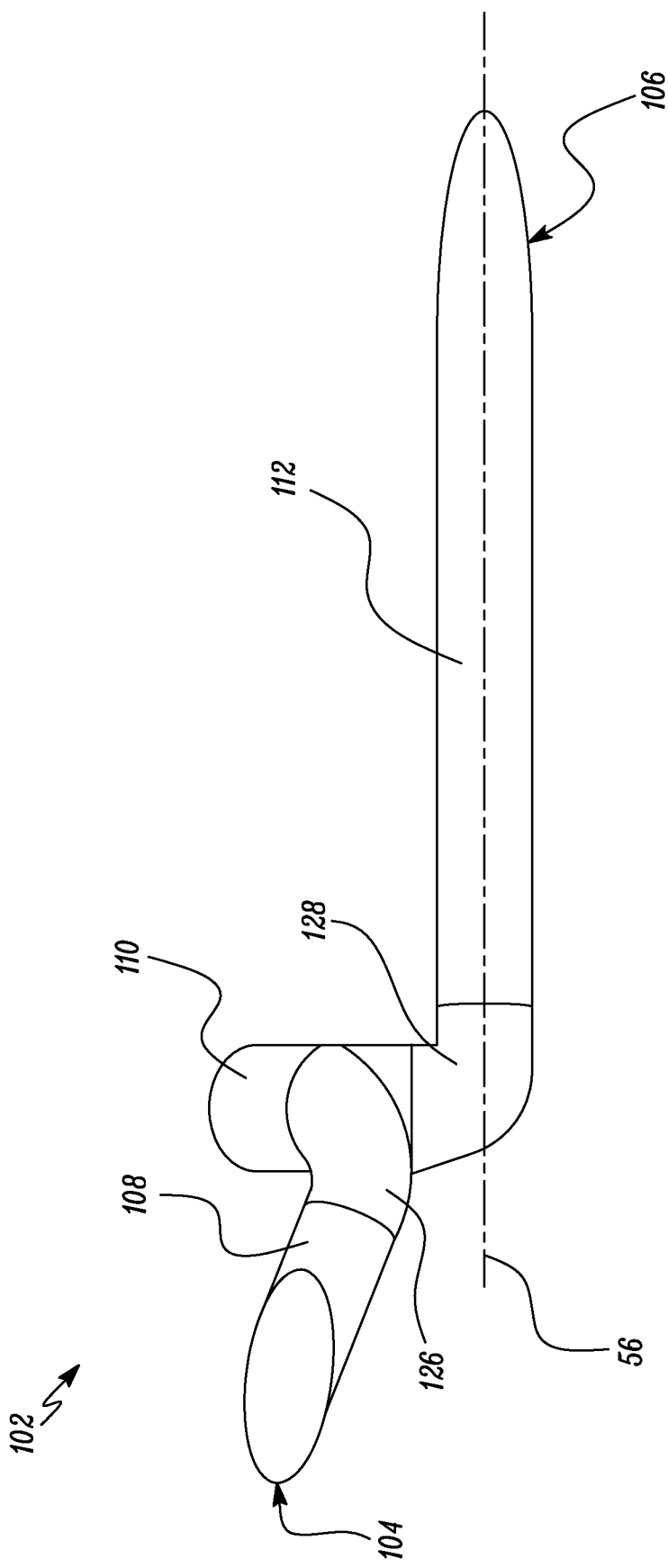

FIGS. 5A-5C illustrate different views of the cooling duct 102. FIG. 5A illustrates a perspective view of the cooling duct 102. FIG. 5B illustrates a top view of the cooling duct 102. FIG. 5C illustrates a front view of the cooling duct 102. The cooling duct 102 includes the inlet 104, the outlet 106, the first portion 108, the second portion 110, and the third portion 112. In this example, the cooling duct 102 has an approximately circular cross-section along its length. In some examples, the cooling duct 102 may have one of an elliptical, rectangular, and polygonal cross-sections along its length. In the example illustrated in FIGS. 5A-5C, each of the inlet 104 and the outlet 106 has an approximately elliptical shape. In this example, an area of the inlet 104 is different from an area of the outlet 106. Specifically, the area of the inlet 104 is less than the area of the outlet 106. In some other examples, the area of the inlet 104 may be equal to or greater than the area of the outlet 106.

The first portion 108 extends at least axially and radially relative to the principal rotational axis 56. The first portion 108 may further extend circumferentially relative to the principal rotational axis 56. The second portion 110 is downstream of the first portion 108 and connected to the first portion 108 via a first curved portion 126. The second portion 110 extends circumferentially around the engine core 54 relative to the principal rotational axis 56. The second portion 110 may be the spiral portion of the cooling duct 102. In this example, the second portion 110 may extend circumferentially by about 180 degrees relative to the principal rotational axis 56. However, the second portion 110 may extend circumferentially by less than 180 degrees or greater than 180 degrees. In some examples, the second portion 110 may form one or more turns relative to the principal rotational axis 56. The third portion 112 is downstream of the second portion 110. The second portion 110 is connected to the third portion 112 via a second curved portion 128. The third portion 112 also extends at least axially and radially relative to the principal rotational axis 56.

The first curved portion 126 may ensure a smooth transition between the first and second portions 108, 110. Similarly, the second curved portion 128 may allow a smooth transition between the second and third portions 110, 112. The first and second curved portions 126, 128 may therefore allow a smooth flow of bypass air D between the first portion 108, the second portion 110 and the third portion 112.

Figure 6:
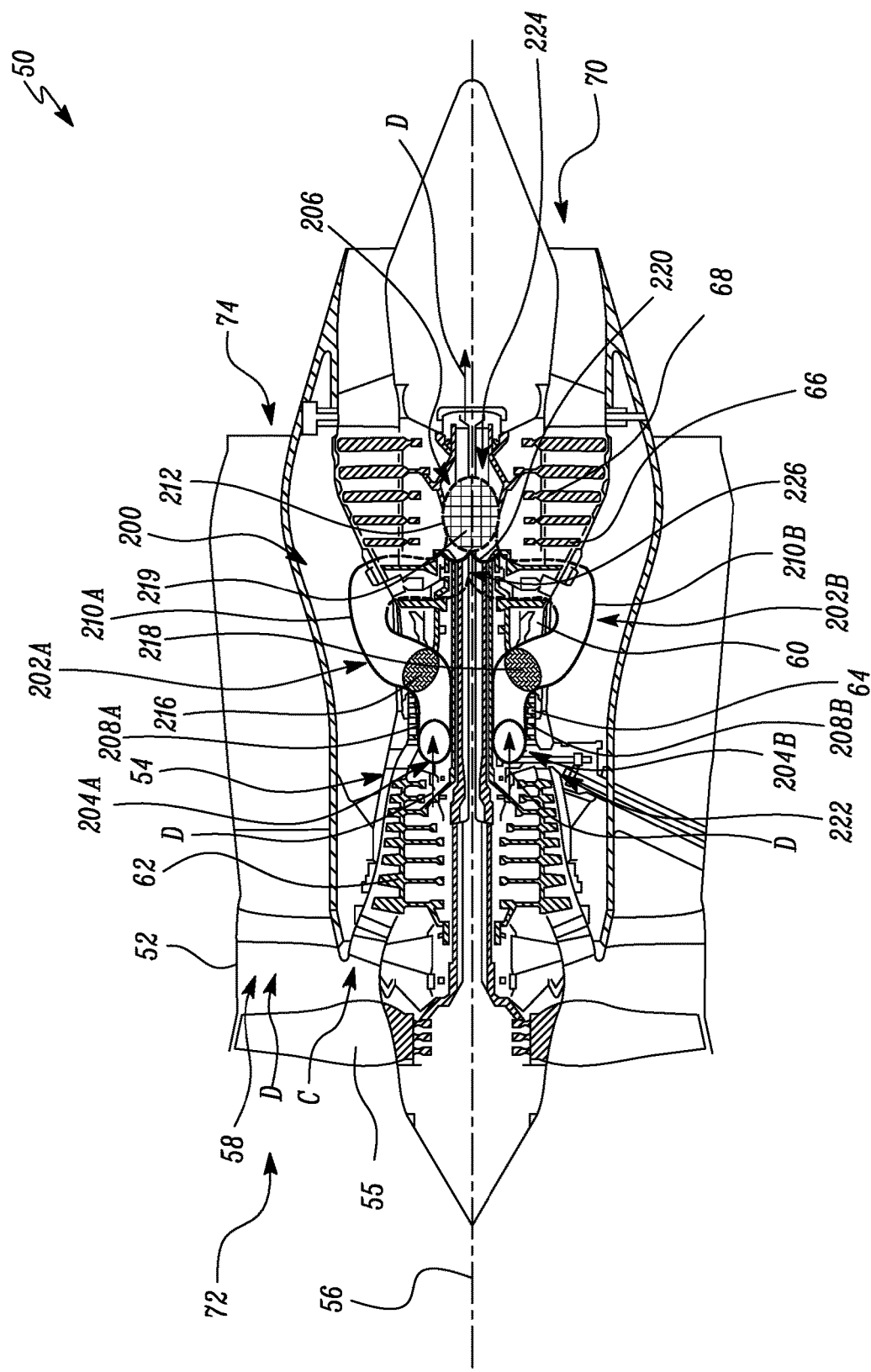
FIG. 6 is a sectional top view of a gas turbine engine including a cooling system having two cooling ducts sharing a common outlet.
Figure 7A:
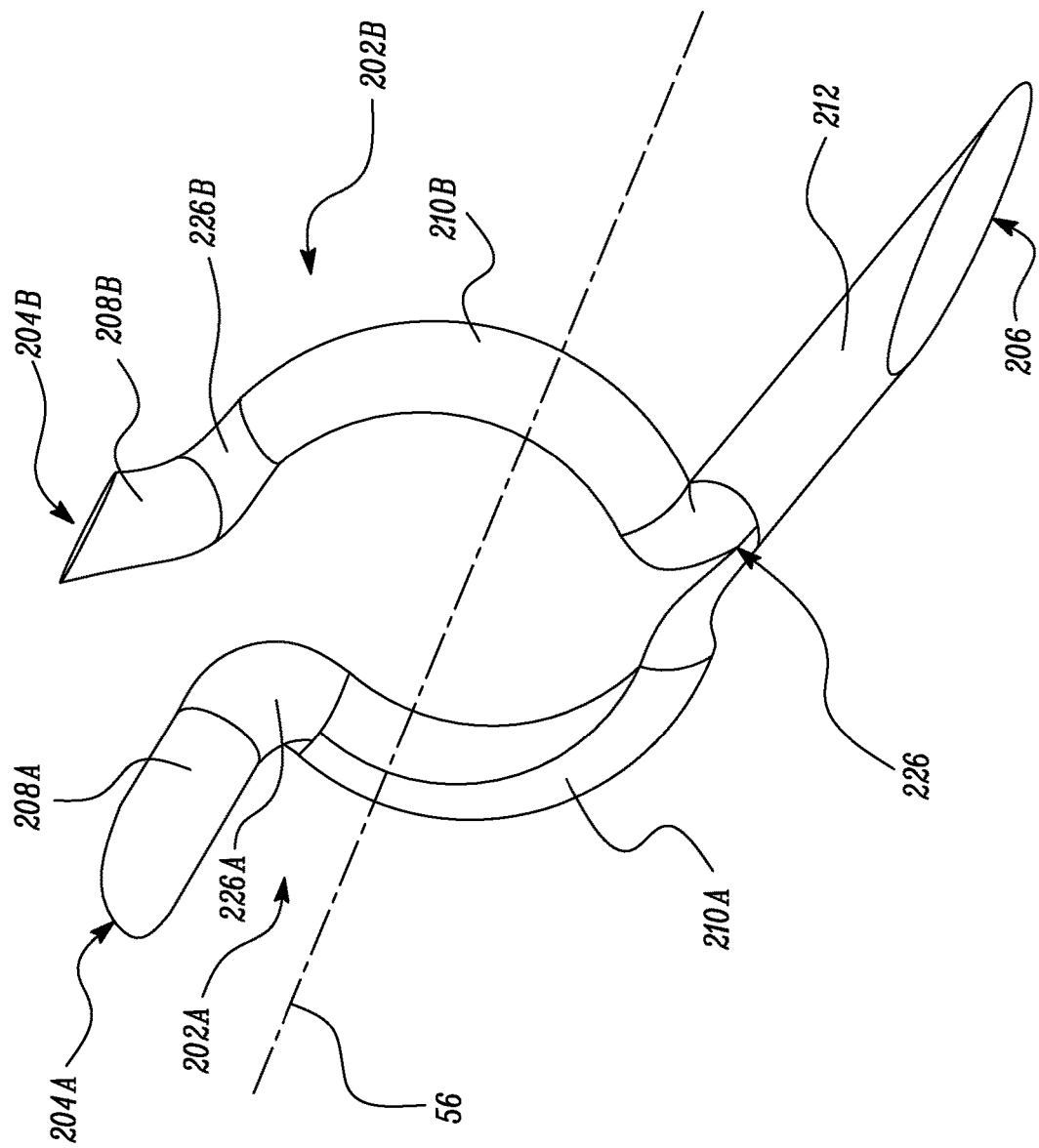
FIGS. 7A-7D are perspective, front, side and top views of the cooling ducts of the cooling system of FIG. 6.
Figure 7B:
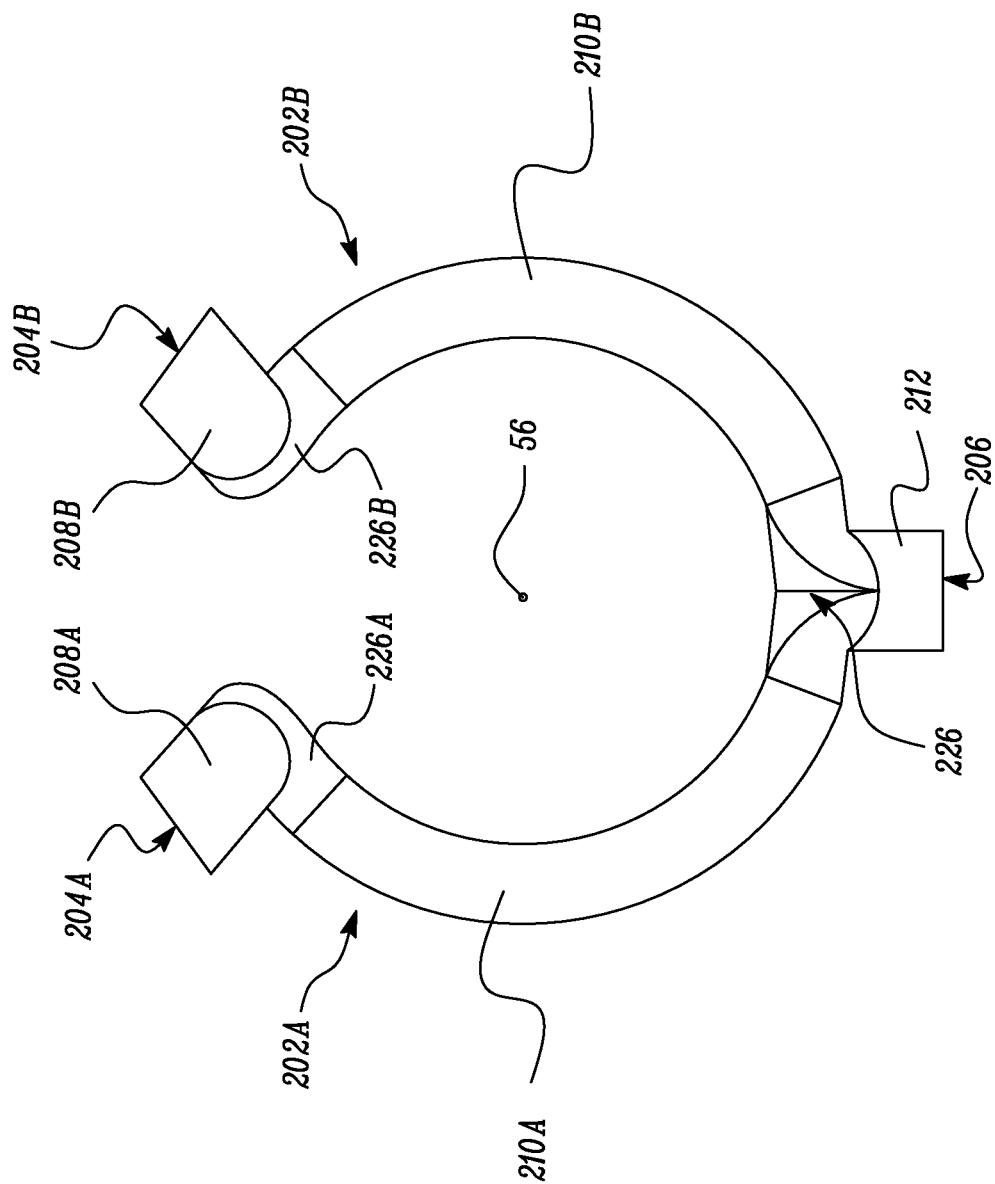
Figure 7C:
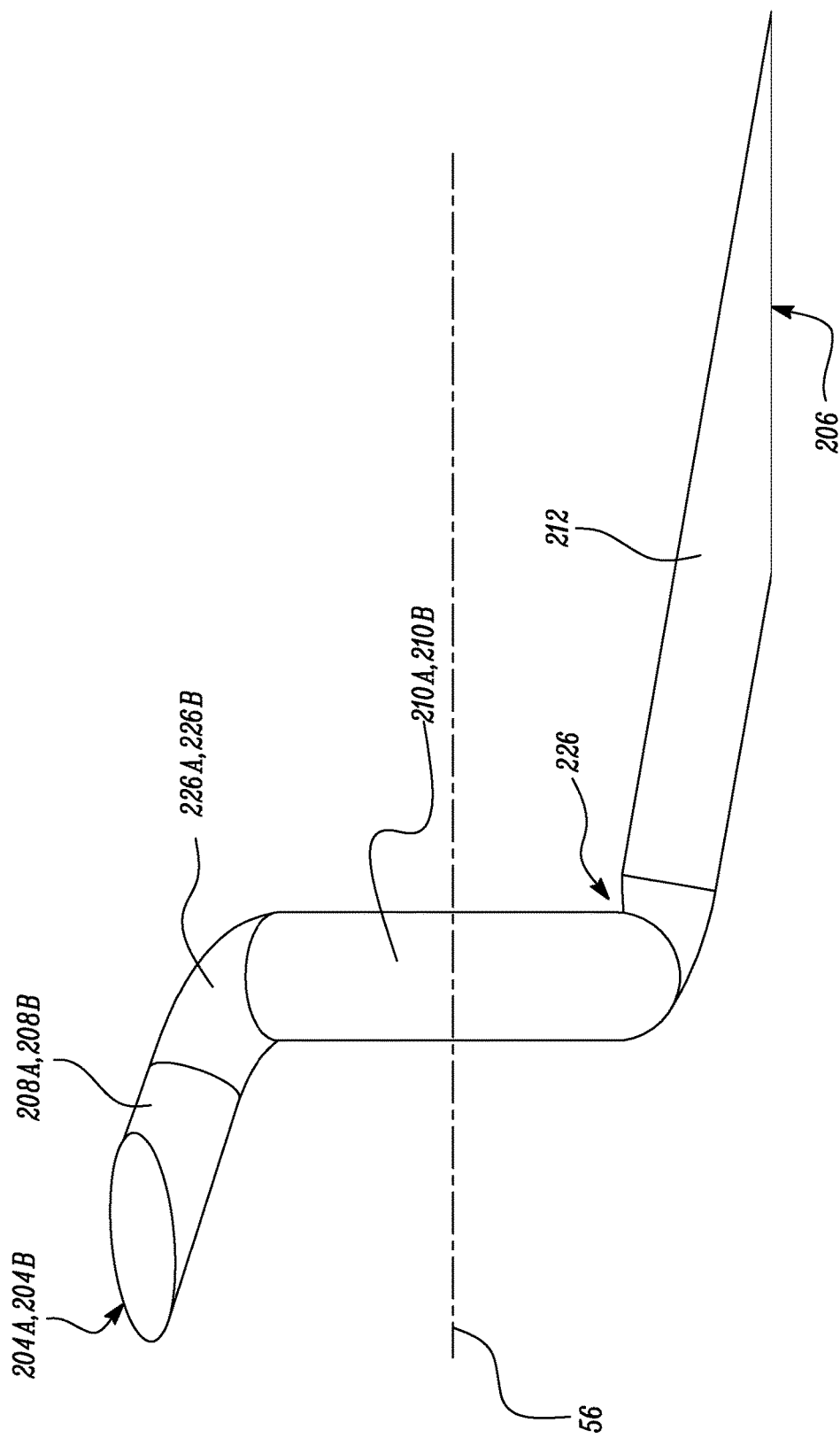
Figure 7D:
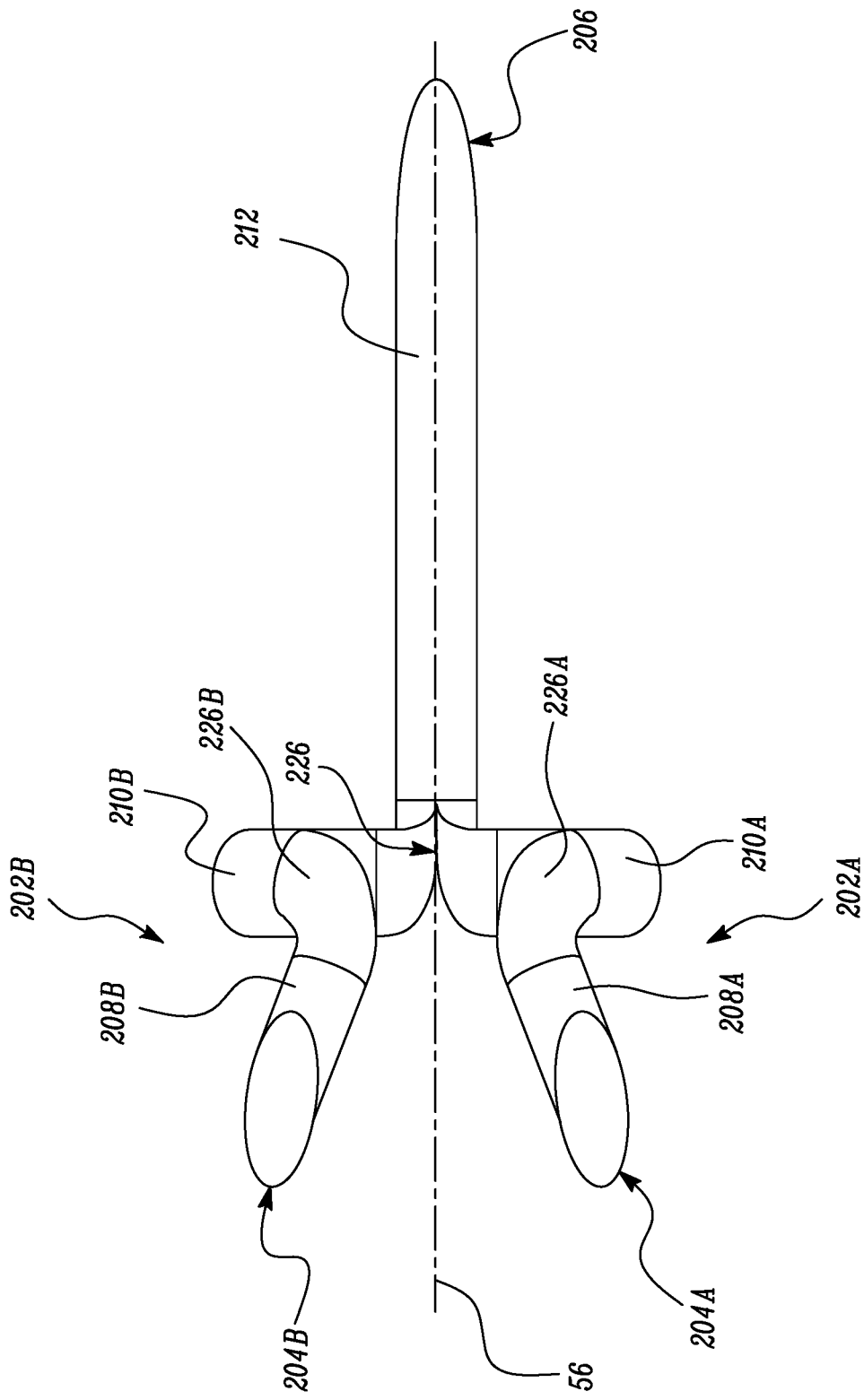

FIG. 6 is a sectional top view of the gas turbine engine 50 including a cooling system 200. The cooling system 200 includes two cooling ducts 202A, 202B. The two cooling ducts 202A, 202B merge with each other at a junction 226 downstream of their inlets 204A, 204B so that the two cooling ducts 202A, 202B share a common outlet 206.

Each of the cooling ducts 202A, 202B extends, relative to the principal rotational axis 56, both axially and circumferentially around a section of the engine core 54. In an example, each of the cooling ducts 202A, 202B extends, relative to the principal rotational axis 56, circumferentially around a section of the engine core 54 including the combustor section 60.

Each of the cooling ducts 202A, 202B is a hollow tubular component. Each of the cooling ducts 202A, 202B defines the respective inlet 204A, 2024B for receiving the bypass air D from the bypass passage 58 at an upstream location 222 and the common outlet 206 for discharging the bypass air D at a downstream location 224.

In this example each of the two cooling ducts 202A, 202B includes a first portion 208A, 208B and a second portion 210A, 210B. The first portion 208A of the cooling duct 202A defines the inlet 204A. Similarly, the first portion 208B of the cooling duct 202B defines the inlet 204B. Each of the first portions 208A, 208B extends at least axially relative to the principal rotational axis 56. Each of the second portions 210A, 210B is downstream of the respective first portion 208A, 208B. Specifically, the second portion 210A is downstream of the first portion 208A. The second portion 210B is downstream of the first portion 208B. Each of the second portions 210A, 210B extends circumferentially around the engine core 54 relative to the principal rotational axis 56. Each of the two cooling ducts 202A, 202B merge with each other at the junction 226 downstream of each of the second portions 210A, 210B. In this example, the two cooling ducts 202A, 202B further include a shared third portion 212 downstream of the junction 226. The third portion 212 extends at least axially relative to the principal rotational axis 56. The third portion 212 defines the common outlet 206.

In some examples the cooling system 200 includes one or more grids, one or more non-return valve, one or more heat transfer enhancement elements (not shown in FIG. 6), and one or more airflow boosters (not shown in FIG. 6).

In the example illustrated in FIG. 6, the cooling system 200 includes a first grid 216, a second grid 218, and a third grid 219. The first grid 216 and the second grid 218 are disposed proximate to the inlets 204A, 204B, respectively. Specifically, the first grid 216 is disposed in the cooling duct 202A proximate to the inlet 204A. The first grid 216 may prevent debris from entering the cooling duct 202A via the inlet 204A. The second grid 218 is disposed in the cooling duct 202B proximate to the inlet 204B. The second grid 218 may prevent debris from entering the cooling duct 202B via the inlet 204B. The cooling system 200 further includes the third grid 219 disposed downstream of the junction 226 and upstream of the common outlet 206 for preventing debris entering the common outlet 206 of the two cooling ducts 202A, 202B. Therefore, only one grid may be needed in the cooling system 200 proximate to the common outlet 206.

In the example illustrated in FIG. 6, the cooling system 200 further includes a non-return valve 220 disposed downstream of the junction 226 and upstream of the common outlet 206 for preventing airflow from the common outlet 206 to the inlets 204A, 204B of the two cooling ducts 202A, 202B. The non-return valve 220 may therefore prevent backflow in the cooling ducts 202A, 202B.

While in this example the cooling system 200 has two cooling ducts, the cooling system may include more than two cooling ducts. The cooling ducts may be disposed around, for example symmetrically around, the engine core 54, which may reduce potential distortion in flow through the bypass passage 58. In the example illustrated in FIG. 6, the two cooling ducts 202A, 202B have a symmetric configuration that may allow installation of other components that surround the engine core 54. Moreover, the inlets 204A, 204B may be also be disposed in suitable locations that allow installation of other components, such as struts.

FIG. 6 illustrates the inlets 204A, 204B disposed at an upper side of the engine core 54 and the common outlet 206 disposed at a lower side of the engine core 54. However, in some other examples, the inlets 204A, 204B may be disposed at the lower side of the engine core 54 and the common outlet 206 may be disposed at the upper side of the engine core 54. The inlets could also be disposed on opposite sides of the engine core 54.

FIGS. 7A-7D illustrate a perspective view, a front view, a side view, and a top view, respectively, of the two cooling ducts 202A, 202B of the cooling system 200 shown in FIG. 6.

Each of the two cooling ducts 202A, 202B includes the first portions 208A, 208B and the second portions 210A, 210B. Each of the first portions 208A, 208B extends at least axially relative to the principal rotational axis 56. In this example, each of the first portions 208A, 208B extends axially, circumferentially and radially relative to the principal rotational axis 56. Each of the second portions 210A, 210B extends circumferentially around the engine core 54 relative to the principal rotational axis 56. The first portion 208A of the cooling duct 202A is connected to the second portion 210A via a curved portion 226A. The curved portion 226A may enable a smooth transition between the first portion 208A and the second portion 210A. Further, the first portion 208B of the cooling duct 202B is connected to the second portion 210B via a curved portion 226B. The curved portion 226B may enable a smooth transition between the first portion 208B and the second portion 210B. Each of the two cooling ducts 202A, 202B merge with each other at the junction 226 downstream of each of the second portions 210A, 210B. The two cooling ducts 202A, 202B further include the shared third portion 212 extending at least axially relative to the principal rotational axis 56. Each of the first portions 208A, 208B is inclined radially at an angle relative to the principal rotational axis 56. Similarly, the shared third portion 212 is also inclined radially at an angle relative to the principal rotational axis 56. In some other examples, the first portions 208A, 208B, and the shared third portion 212 may be approximately parallel to the principal rotational axis 56.

Each of the second portions 210A, 210B may be the spiral portion of the respective cooling duct 202A, 202B. In this example, each of the second portions 210A, 210B may extend circumferentially by about 180 degrees relative to the principal rotational axis 56. However, each of the second portions 210A, 210B may extend circumferentially by less than 180 degrees or greater than 180 degrees. In some examples, each of the second portions 210A, 210B may form one or more turns relative to the principal rotational axis 56.

In the example illustrated in FIGS. 7A-7D, each of the two cooling ducts 202A, 202B has a circular cross-section along its length. In some other examples, each of the two cooling ducts 202A, 202B may have one of elliptical, rectangular, and polygonal cross-section along its length. The cooling duct 202A may be a mirror image of the cooling duct 202B. However, in some other examples, the two cooling ducts 202A, 202B may not be mirror images of each other. In the example illustrated in FIGS. 7A-7D, each the inlets 204A, 204B has an elliptical shape. Further, the common outlet 206 has an elliptical shape. An area of each of the inlets 204A, 204B is different from the area of the common outlet 206. Specifically, the area of the common outlet 206 is greater than the area of each of the inlets 204A, 204B. The common outlet 206 may discharge combined flows received at the inlets 204A, 204B. The areas of the inlets 204A, 204B and the common outlet 206 may be varied as per desired flow attributes.

Figure 8:
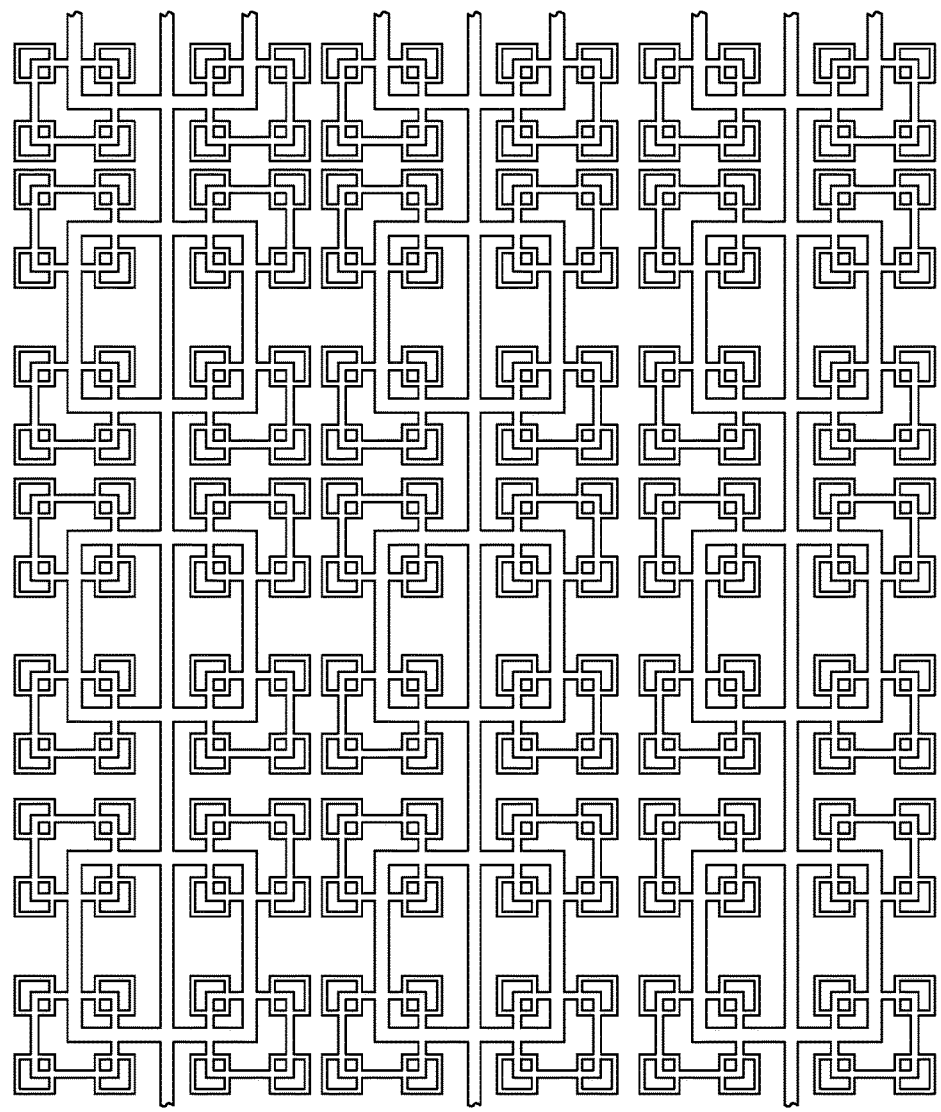
FIG. 8 is a schematic view of a fractal grid used in a cooling system of a gas turbine engine.

FIG. 8 illustrates the schematic view of a fractal grid 300. While FIG. 8 shows a fractal grid having a particular fractal pattern, it is to be appreciate that this only to illustrate the concept and that other fractal grids could be used. The grid 300 includes multiple microgrids arranged to follow a fractal or recursive pattern. In the grid 300, a microgrid may further include smaller microgrids or "fractal units". The grid 300 may act as a turbulator and generate turbulence in the airflow, thereby increasing the heat exchange with the engine core 54. The grid 300 may be disposed within the cooling duct 102 of the cooling system 100 shown in FIG. 4. The grid 300 may also prevent debris from entering the cooling duct 102. The grid 300 may further reduce pressure drop to increase airflow in the cooling duct 102 as opposed to conventional Foreign Object Debris (FOD) screens. In some examples, the grid 300 may be disposed proximate to the inlet 104 and/or the outlet 106 of the cooling duct 102. The grid 300 may also be disposed within at least one of the two cooling ducts 202A, 202B of the cooling system 200 shown in FIG. 6. The grid 300 may prevent debris from entering the cooling ducts 202A, 202B. In some examples, the grid 300 may be disposed proximate to the inlets 204A, 204B and/or the common outlet 206.

Figure 9B:
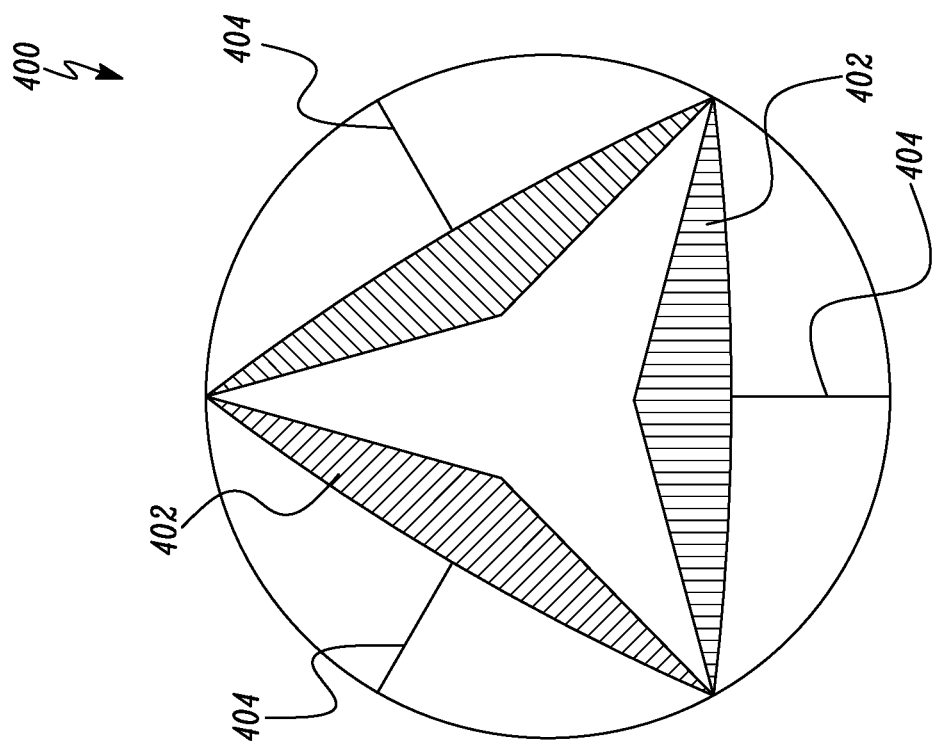
FIG. 9B is schematic front view of the non-return valve of FIG. 9A in an open position.
Figure 9A:
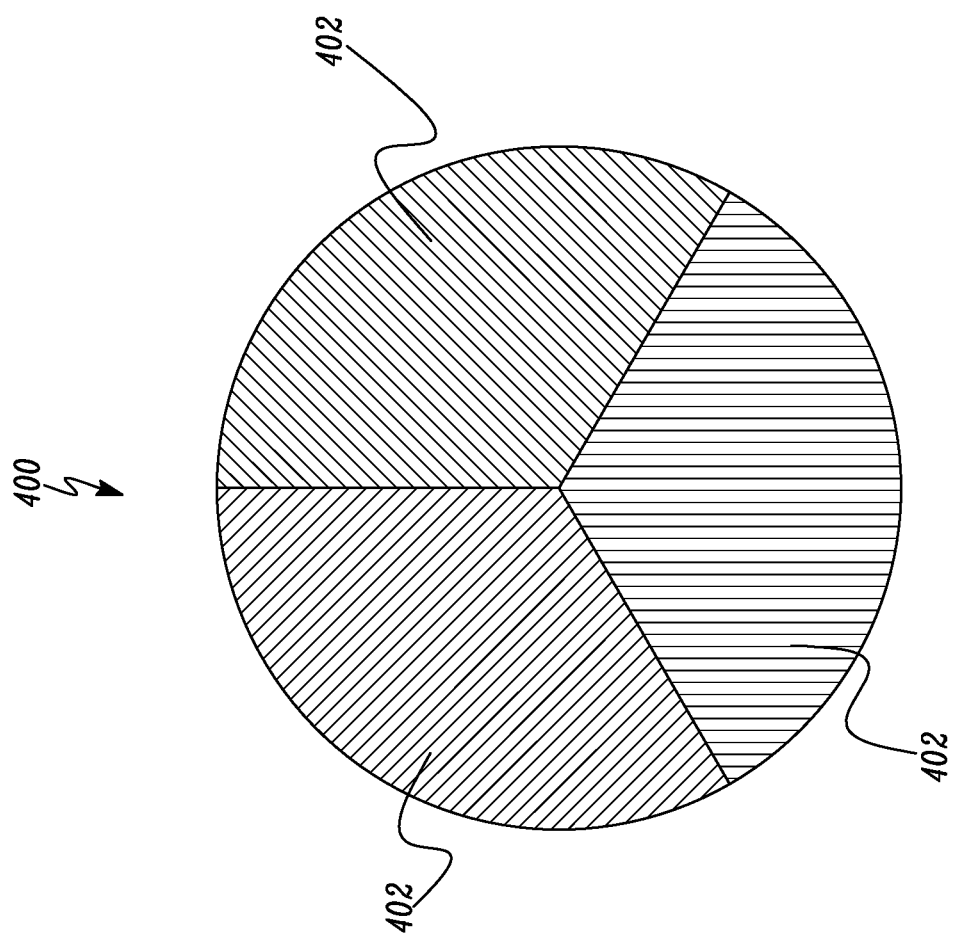
FIG. 9A is schematic front view of a non-return valve in a closed position used in a cooling system of a gas turbine engine.

FIGS. 9A and 9B are front views of a non-return valve 400. In this example, the non-return valve 400 is a tricuspid valve. The non-return valve 400 is further an actuator-free valve. In other words, the non-return valve 400 may not need a separate actuator. The non-return valve 400 is a one-way valve that provides unidirectional flow across it. FIG. 9A shows a closed position of the non-return valve 400. FIG. 9B shows an open position of the non-return valve 400. The non-return valve 400 includes flaps 402 and support legs 404. The flaps 402 may be approximately triangular. The support legs 404 may prevent opening of the non-return valve 400 beyond desirable angles. Different intermediate positions of the non-return valve 400 are also possible with the help of support legs 404. The non-return valve 400 may be disposed within the cooling system 100 (shown in FIG. 4) for preventing airflow from the outlet 106 to the inlet 104. The non-return valve 400 may be in the closed position when the airflow is from the outlet 106 to the inlet 104 and may be in the open position during a regular airflow. The non-return valve 400 may be disposed proximate to the outlet 106. The non-return valve 400 may also be disposed within the cooling system 200 shown in FIG. 6 for preventing airflow from the common outlet 206 to the inlets 204A, 204B.

FIGS. 10A-10C illustrate a cross-section of the cooling duct 102 of FIG. 4 including the non-return valve 400 shown in FIGS. 9A and 9B. In this example, the non-return valve 400 is disposed within the cooling duct 102. The non-return valve 400 allows a unidirectional airflow AF in the cooling duct 102. The airflow AF is present in both top and bottom sides of the flaps 402. The support legs 404 may ensure a minimum angle of the respective flaps 402 with respect to an axis of the cooling duct 102. The support legs 404 may retain the flaps 402 in the open position. In case of a reverse airflow, the flaps 402 may hinge to contact one another so that the non-return valve 400 is in the closed position. Referring to FIGS. 10A-C, the non-return valve 400 is shown in a closed, a partially open, and an open position, respectively.

Figure 11:
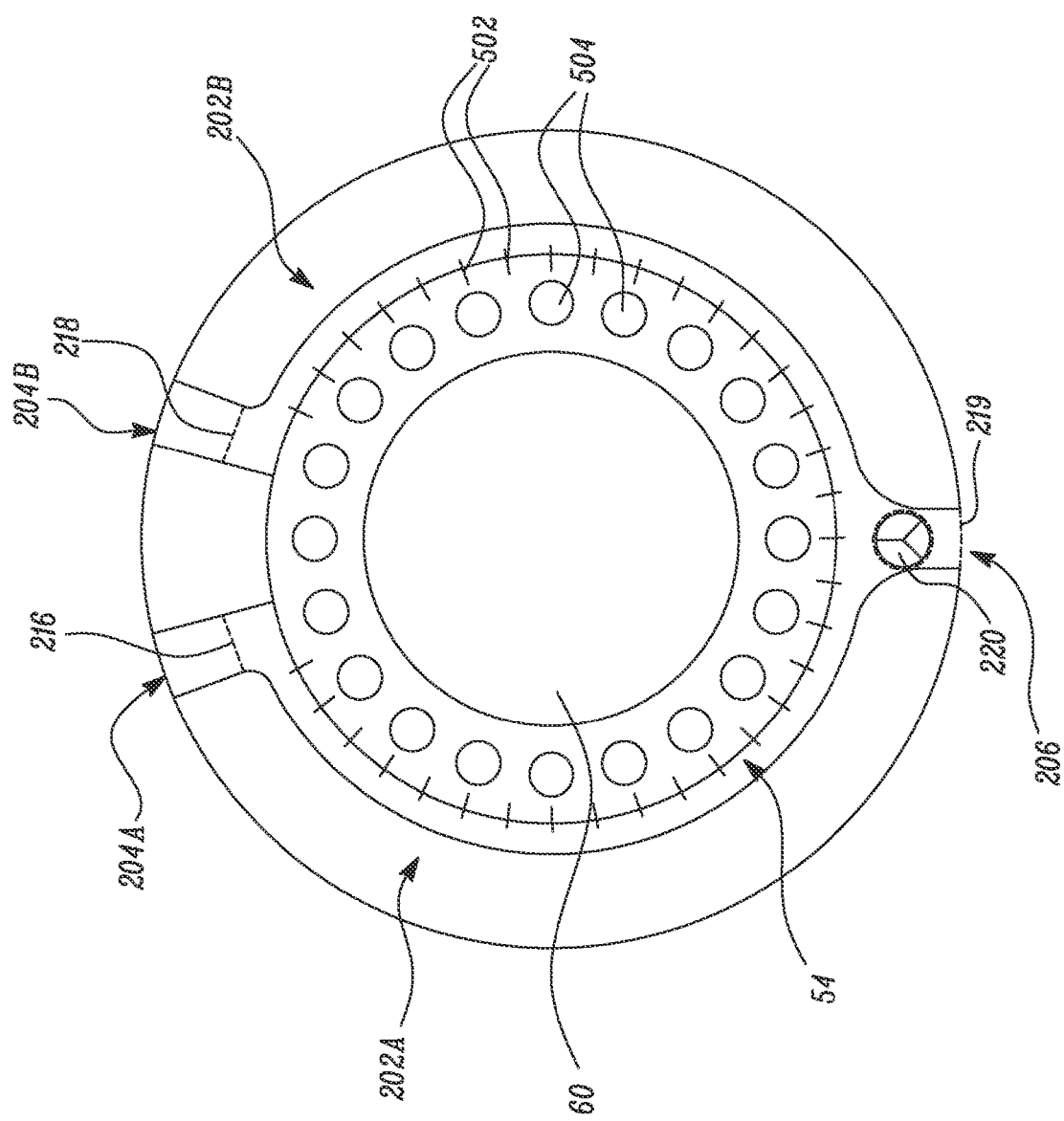
FIG. 11 is a schematic view of one or more heat transfer enhancement elements of a cooling system of a gas turbine engine.

FIG. 11 is a cross-sectional view of an engine core 54 and cooling system 200 showing one or more optional heat transfer enhancement elements 502 of the cooling system 200. Note that combustor cans 504 in the combustor section 60, are visible in FIG. 11. The one or more heat transfer enhancement elements 502 are disposed between the engine core 54 and the cooling ducts 202A, 202B and are, in this example, arranged around the core 54. The heat transfer enhancement elements 502 may be provided in an outer wall or casing of the engine core 54, or otherwise at an interface between the cooling ducts 202A, 202B and the engine core 54. The one or more heat transfer enhancement elements 502 may include fins and/or heat pipes and may promote or enhance turbulence in the airflow around the core 54 to increase the rate of heat ejection. Cooling air may flow around the heat pipes and/or fins. The heat transfer enhancement elements 502 may have different shapes as per desired application attributes. For example, the fins may be of a rectangular, triangular, shark-fin or cylindrical geometry or of any other suitable geometry. The heat pipes may be of a rectangular, cylindrical or curved geometry, or of any other suitable geometry. Heat pipes may be used in conjunction with fins to further boost the rate of heat rejection.

Figure 12:
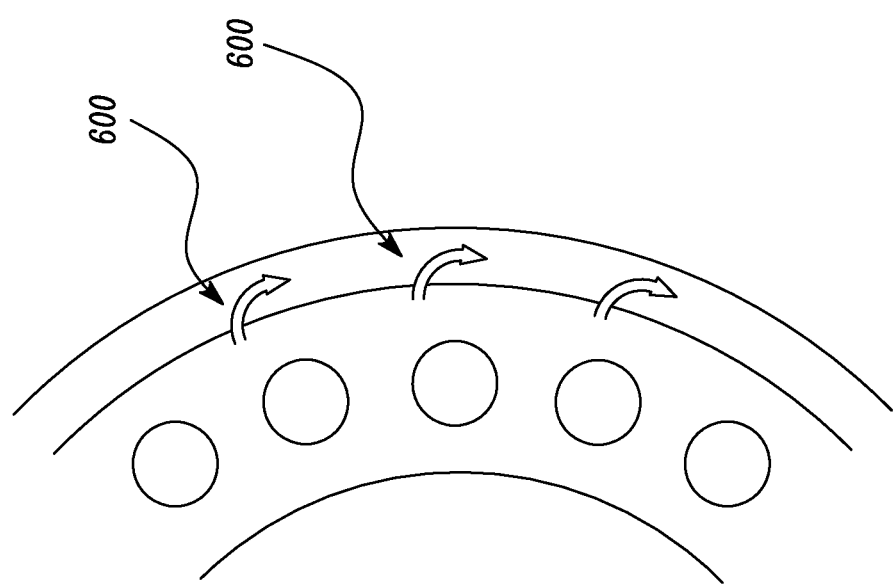
FIG. 12 is a schematic view of an airflow booster of a cooling system of a gas turbine engine.

FIG. 12 is a schematic view of optional airflow boosters 600 of the cooling system 200 of the gas turbine engine 50. The airflow boosters 600 may be, for example, one or more of nozzle ejectors, an electric fan or micro-compressors and introduce a relatively small amount of high-pressure bleed air to increase the amount of the airflow through the cooling ducts 202A. This may increase the amount of airflow through the cooling ducts 102, 202A, 202B. Each of the nozzle ejectors may be of a convergent or a convergent-divergent nozzle design. In some examples, each of the nozzle ejectors may have small diameter, for example less than 5 mm, less than 4 mm, less than 2 mm, or less than 1 mm. The nozzle ejectors may be directly welded or bolted onto the outer casing of the engine core 54. The airflow boosters 600 may be disposed proximate to the outlet 106 or the common outlet 206.

While the heat transfer enhancement elements 502 and airflow boosters 600 have generally been described in the context of the cooling system 200 with two ducts, it will be understood that they could equally be used in a system 100 with one duct or a system with greater than two ducts.

It will be understood that the invention is not limited to the embodiments above described and various modifications and improvements can be made without departing from the concepts described herein.

I claim:

1. A gas turbine engine comprising:
a nacelle;
an engine core received within the nacelle and defining a principal rotational axis along a length of the engine core, the engine core and the nacelle defining a bypass passage therebetween; and
a cooling system including first and second cooling ducts each wherein:
the first cooling duct includes (i) a first inlet configured to receive bypass air from the bypass passage, (ii) a first portion that extends at least axially relative to the principal rotational axis, and (iii) a second portion located downstream relative to the first portion, the second portion extending circumferentially around the engine core in a first circumferential direction relative to the principal rotational axis,
the second cooling duct includes (i) a second inlet configured to receive the bypass air from the bypass passage, (ii) a third portion that extends at least axially relative to the principal rotational axis, and (iii) a fourth portion located downstream relative to the third portion, the fourth portion extending circumferentially around the engine core in a second circumferential direction, opposite the first circumferential direction, relative to the principal rotational axis,
the second portion of the first cooling duct and the fourth portion of the second cooling duct merge to form a fifth portion which ends in a common outlet configured to discharge the bypass air, and
the second and fourth portions extend circumferentially around the engine core such that second and fourth portions form a ring shape when viewed along the principal rotational axis.

2. The gas turbine engine of claim 1, wherein:
the engine core includes a combustor section, and
the second and the fourth portions extend circumferentially around a section of the engine core including the combustor section.

3. The gas turbine engine of claim 1, further comprising one or more grids disposed within each of the first and second cooling ducts for preventing debris from entering each of the first and second cooling ducts.

4. The gas turbine engine of claim 3, wherein the one or more grids include a first grid disposed at each of the respective first and second inlets and a second grid disposed at the common outlet.

5. The gas turbine engine of claim 3, wherein at least one of the one or more grids is a fractal grid.

6. The gas turbine engine of claim 1, further comprising a plurality of non-return valves disposed within each of the first and second cooling ducts for preventing airflow from the common outlet to the first and second inlets.

7. The gas turbine engine of claim 6, wherein one of the plurality of non-return valves is disposed at the common outlet.

8. The gas turbine engine of claim 6, wherein the plurality of non-return valves are tricuspid valves.

9. The gas turbine engine of claim 1, wherein the cooling system further includes one or more heat transfer enhancement elements disposed between the engine core and each of the first and second cooling ducts for increasing heat transfer from the engine core to each of the first and second cooling ducts.

10. The gas turbine engine of claim 9, wherein the one or more heat transfer enhancement elements include at least one of fins and heat pipes.

11. The gas turbine engine of claim 1, wherein the cooling system further includes one or more airflow boosters disposed within each of the first and second cooling ducts.

12. The gas turbine engine of claim 11, wherein the one or more airflow boosters include at least one of nozzle ejectors, an electric fan, and micro-compressors.

13. The gas turbine engine of claim 1, wherein each of the first and second cooling ducts is spiral-shaped.

14. The gas turbine engine of claim 1, wherein the fifth portion extends at least axially relative to the principal rotational axis to the common outlet.

15. The gas turbine engine of claim 14, further comprising a non-return valve disposed in the fifth portion for preventing airflow from the common outlet to the respective first and second inlets of the first and second cooling ducts.

16. The gas turbine engine of claim 14, further comprising a grid disposed in the fifth portion for preventing debris passing through the common outlet of the first and second cooling ducts.

17. A gas turbine engine comprising:
a nacelle;
an engine core received within the nacelle and defining a principal rotational axis along a length of the engine core, the engine core and the nacelle defining a bypass passage therebetween; and
a cooling system including first and second cooling ducts, wherein
the first cooling duct includes (i) a first inlet configured to receive bypass air from the bypass passage, (ii) a first portion that extends at least axially relative to the principal rotational axis, and (iii) a second portion located downstream relative to the first portion, the second portion extending circumferentially around the engine core in a first circumferential direction relative to the principal rotational axis,
the second cooling duct includes (i) a second inlet configured to receive the bypass air from the bypass passage, (ii) a third portion that extends at least axially relative to the principal rotational axis, and (iii) a fourth portion located downstream relative to the third portion, the fourth portion extending circumferentially around the engine core in a second circumferential direction, opposite the first circumferential direction, relative to the principal rotational axis,
the second portion of the first cooling duct and the fourth portion of the second cooling duct merge to form a fifth portion which ends in a common outlet configured to discharge the bypass air, and
the cooling system further includes a plurality of heat transfer enhancement elements disposed between the engine core and each of the first and second cooling ducts for increasing heat transfer from the engine core to each of first and second two cooling ducts, the plurality of heat transfer enhancement elements being provided in an outer wall or casing of the engine core and circumferentially spaced around the engine core.

* * * * *